(12) United States Patent
Bin Abd Razak et al.

(10) Patent No.: US 7,419,113 B2
(45) Date of Patent: Sep. 2, 2008

(54) DRAG DEVICE FOR SPINNING REEL

(75) Inventors: Noor Azri Bin Abd Razak, Pontian (MY); Miang Chin Goh, Pontian (MY)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/802,040

(22) Filed: May 18, 2007

(65) Prior Publication Data
US 2007/0284466 A1 Dec. 13, 2007

(30) Foreign Application Priority Data
May 26, 2006 (JP) .............................. 2006-146739

(51) Int. Cl.
*A01K 89/01* (2006.01)
(52) U.S. Cl. ...................... 242/245; 242/303; 242/305; 242/307
(58) Field of Classification Search ................ 242/245, 242/302, 303, 305, 306, 307, 308
See application file for complete search history.

(56) References Cited

U.S. PATENT DOCUMENTS

| 4,572,448 | A | * | 2/1986 | Ban | 242/245 |
| 4,725,012 | A | * | 2/1988 | Councilman | 242/245 |
| 4,804,150 | A | * | 2/1989 | Takeuchi | 242/245 |
| 4,988,057 | A | * | 1/1991 | Hitomi | 242/245 |
| 5,626,303 | A | * | 5/1997 | Bringsen | 242/265 |
| 6,957,788 | B2 | * | 10/2005 | Kitajima | 242/307 |
| 7,165,736 | B2 | * | 1/2007 | Kitajima | 242/245 |

FOREIGN PATENT DOCUMENTS

| EP | 0392501 A2 | 10/1990 |
| EP | 1506707 A2 | 2/2005 |
| EP | 1597966 A1 | 11/2005 |
| JP | 08-10284 Y2 | 3/1996 |

* cited by examiner

*Primary Examiner*—Emmanuel M Marcelo
(74) *Attorney, Agent, or Firm*—Shinjyu Global IP

(57) ABSTRACT

A drag mechanism includes a first drag unit, a second drag unit and a switching mechanism. The first drag unit brakes a spool shaft of a spool. The first drag unit includes a first drag knob that is immovable in a back and forth direction and rotatably mounted on an outer peripheral surface of a cylindrical portion. The second drag unit brakes the spool shaft in a position frontward of the first drag unit. The second drag unit includes a second drag knob that is immovable in a back and forth direction and rotatably mounted on an outer peripheral surface of the cylindrical portion. The switching mechanism switches the first drag unit between a drag enabling state and a drag disabling state.

6 Claims, 5 Drawing Sheets

DRAG DEVICE FOR SPINNING REEL

CROSS-REFERENCE TO RELATED APPLICATIONS

This application claims priority under 35 U.S.C. § 119 to Japanese Patent Application No. 2006-0146739 filed on May 26, 2006. The entire disclosure of Japanese Patent Application No. 2006-0146739 is hereby incorporated herein by reference.

BACKGROUND OF THE INVENTION

1. Field of the Invention

The present invention generally relates to a drag device. More specifically, the present invention relates to a drag device for a spinning reel that is arranged at a rear portion of a reel unit of the spinning reel.

2. Background Information

A spinning reel is furnished with a drag mechanism which brakes rotation of a spool in a line releasing direction to prevent the fishing line from breaking. Among the types of drag devices, a drag device including two, strongly and weakly operating switchable drag units that are arranged at a rear portion of a reel unit is known (see, for example, Japanese Utility Model Post-Grant Gazette Pub. No. H08-10284).

The known drag device includes a first drag unit that is arranged at a rear portion of a reel unit, a second drag unit that is arranged in a position frontward of the first drag unit and a switching mechanism that switches the first drag unit between a drag enabling state and a drag disabling state. The first drag unit is used to apply a strong drag force on a spool to brake the spool in order to prevent the fishing line from breaking when a fish is caught on tackle. For example, when a fish, such as a sardine, is used as a swimming live bait, the second drag unit is used to apply a weak drag force on the spool to brake the spool to the extent that the swimming live bait fish cannot release the fishing line too much.

The first drag unit includes a closed-ended cylindrical first drag knob, a pressing member, and a plurality of first pressed units. The first drag knob is threaded into a cylindrical portion that is formed at the rear portion of the reel unit. The pressing member is integrally rotatable with and connected to the first drag knob with a screw. The first pressed units are pressed by the pressing member. The second drag unit includes a cylindrical second drag knob and a plurality of second pressed units. The second drag knob is threaded into the cylindrical portion in a position frontward of the drag knob. The second pressed units are pressed by the second drag knob.

The switching mechanism includes a switching member, first and second engagement members and a switching lever. The switching member is non-rotatably mounted to a spool shaft and movable in the axial direction between a first position and a second position, which is frontward of the first position. The first and second engagement members engage the switching member. The switching lever moves the switching member between the first and second positions. The first engagement member is provided with the first pressed units on the periphery thereof, and non-rotatably engages the switching member when the switching member is located in the first position. The second engagement member is provided with the second pressed units on the periphery thereof, and constantly non-rotatably engages the switching member.

In a spinning reel constructed in this manner, when the switching member is moved to the first position by the switching lever, the first drag unit operates to provide a strong drag force. On the other hand, when the switching member is moved to a position frontward of the second position with the switching lever, the first drag unit is placed in the drag disabling state. Thus, only the second drag unit operates and provides a weak drag force. The drag force of the first drag unit is adjusted by the first drag knob. For example, as the first drag knob is rotated in a threadedly-tightened direction, the first drag knob and the first pressing member are moved forward and gradually but strongly press the first pressed units to provide a strong drag force of the first drag unit. As the first drag knob is rotated in the opposite direction, the first drag knob and the first pressing member are moved backward to provide a weak drag force of the first drag unit. Similarly, for example, as the second drag knob is rotated in the threadedly-tightened direction, the second drag knob is moved forward and gradually but strongly presses the second pressed units to provide a strong drag force of the second drag unit. As rotated in the opposite direction, the second drag knob is moved backward to provide a weak drag force of the second unit.

In the above-described spinning reel, when the first and second drag knobs are operated and rotated for drag-force adjustment, they are moved back and forth since both the first and second drag knobs are threaded into the cylindrical peripheral surface. Accordingly, a gap occasionally appears between the first drag knob and the second drag knob in a position frontward of the first drag knob, or between the second drag knob and the rear portion of the reel unit. If such a gap appears, foreign substances such as dirt and residue of bait gets into the drag knob. In this case, the first or second drag knob becomes difficult to rotate. This may deteriorate operability of the first or second drag knob.

In view of the above, it will be apparent to those skilled in the art from this disclosure that there exists a need for an improved drag device for a spinning reel that prevents foreign substances from getting into a drag knob as much as possible in the drag device of the spinning reel which includes two switchable drag units.

This invention addresses this need in the art as well as other needs, which will become apparent to those skilled in the art from this disclosure.

SUMMARY OF THE INVENTION

A drag device according to a first aspect of the invention is a drag device for a spinning reel that is arranged at a rear portion of a reel unit of the spinning reel and includes a first drag unit, a second drag unit and a switching mechanism. The first drag unit is configured for braking a spool shaft of a spool. The first drag unit includes a first drag knob, a first pressing member and a first pressed unit. The first drag knob is immovable in a back and forth direction and is configured to be rotatably mounted to an outer peripheral surface of a cylindrical portion at a rear portion of the reel unit. The first pressing member is rotatable and movable in the back and forth direction with the first drag knob and is configured to be threaded onto on an inner peripheral surface of the cylindrical portion. The first pressed unit is pressed by the first pressing member. The second drag unit is configured for braking the spool shaft at a position frontward of the first drag unit. The second drag unit includes a second drag knob, a second pressing member and a second pressed unit. The second drag knob is immovable in the back and forth direction and is configured to be rotatably mounted to the outer peripheral surface of the cylindrical portion at a position frontward of the first drag knob. The second pressing member is rotatable and movable in the back and forth direction with the second drag knob and is configured to be threaded onto the outer peripheral surface of the cylindrical portion at a position frontward of the first drag knob of the cylindrical member. The second pressed unit is pressed by the second pressing member. The switching mechanism switches the first drag unit between a drag enabling state and a drag disabling state.

In this drag device, the first drag knob is rotated in either direction when the drag force of the first drag unit is adjusted. When the first drag knob is rotated, the first pressing member that is threaded into the inner peripheral surface of the cylindrical portion moves backwards or forwards to vary a pressing force on the first pressed unit and thus, adjusts the drag force. On the other hand, the second drag knob is rotated in either direction when the drag force of the second drag unit is adjusted. When the second drag knob is rotated, the second pressing member that is threaded into the outer peripheral surface of the cylindrical portion moves backwards and forwards to vary a pressing force on the second pressed unit and thus, adjusts the drag force. In this construction, both the first and second drag knobs are immovably mounted in a back and forth direction to the cylindrical portion. For this reason, when either of the first and second drag knobs is rotated, neither of them is moved back and forth, but is only rotated. Accordingly, a gap between both the first and second drag knobs, and a gap between the second drag knob and the reel unit are reduced to as small as possible. Therefore, it is possible to prevent foreign substance from getting into both the first and second drag knobs as much as possible.

The drag device according to a second aspect of the invention is the drag device according to the first aspect of the invention, wherein the first pressing member presses the first pressed unit in a direction toward the switching mechanism, and the second pressing member presses the second pressed unit in a direction toward the reel unit. In this case, as the first pressing member moves toward the switching mechanism, the drag force of the first drag unit increases, on the other hand, as the first pressing member moves toward the reel unit, the drag force of the second drag unit increases. In this construction, since pressure is applied toward not the reel unit but the switching mechanism, it is possible to simplify the structure of the reel unit.

The drag device according to a third aspect of the invention is the drag device according to the first or second aspect of the invention, wherein the second drag unit brakes the spool shaft with a maximum drag force which is weaker than the drag force of the first drag unit. In this case, since the first drag unit which provides a stronger maximum drag force and is often adjusted is located on the rear side, it is possible to easily adjust a drag force during fishing.

The drag device according to a fourth aspect of the invention is the drag device according to any of the first through third aspects of the invention, wherein the switching mechanism includes a cylindrical switching member, a cylindrical first engagement member with flange, a cylindrical second engagement member, and a switching lever. The cylindrical switching member is movable back and forth between a first position and a second position which is frontward than the first position and non-rotatably mounted to the spool shaft. The cylindrical first engagement member non-rotatably engages to the switching member when the switching member is located in the first position, and is mounted to the cylindrical portion in a state of which the frontward movement is restricted. The cylindrical second engagement member is disposed at the front of the first engagement member and non-rotatably engages to the switching member when the switching member is located in the second position, being mounted to the cylindrical portion in a state of which the frontward movement is restricted. The switching lever is mounted to the reel unit and swingable around a shaft skewing with respect to the spool shaft, and moves the switching member back and forth between the first position and the second position. In this case, a drag force is simply switched by moving the switching member back and forth toward either the first and second positions with the switching lever.

The drag device according to a fifth aspect of the invention is the drag device according to the fourth aspect of the invention, wherein the first pressed unit includes at least one of a first drag disk that is non-rotatably mounted on the outer peripheral surface of the first engagement member, and at least one of a second drag disk that is mounted on the outer peripheral surface of the first engagement member with the first drag disk and non-rotatably engaged to the cylindrical portion; and the second pressed unit includes at least one of a third drag disk that is non-rotatably mounted on the outer peripheral surface of the second engagement member, and at least one of a fourth drag disk that is rotatably mounted on the outer peripheral surface of the second engagement member with the third drag disk and is non-rotatably engaged to the cylindrical portion. In this case, each pressed unit brakes by two types of drag disks which are the second and fourth drag disk that is non-rotatable with the reel unit (cylindrical portion) and the first and third drag disk that is non-rotatable with the spool shaft through one of the engagement members and the switching member.

The drag device according to a sixth aspect of the invention is the drag device according to any of the first through fifth aspects of the invention, wherein the first drag knob includes a cylindrical first knob member with flange that is immovably in the axial direction and rotatably mounted to the cylindrical portion, and a closed-end cylindrical second knob member that is screw-fixed to the first knob member so as to close the rear end of the cylindrical portion; and the first pressing member is integrally rotatable with the second knob member and movable in the axial direction and connected to the second knob member. In this case, since the first drag knob is separated into two members, it is possible to provide a simple structure which can simply assemble a part that is immovable in the axial direction and rotatable with the cylindrical portion (first knob member) and a part that presses the pressing member (second knob member).

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
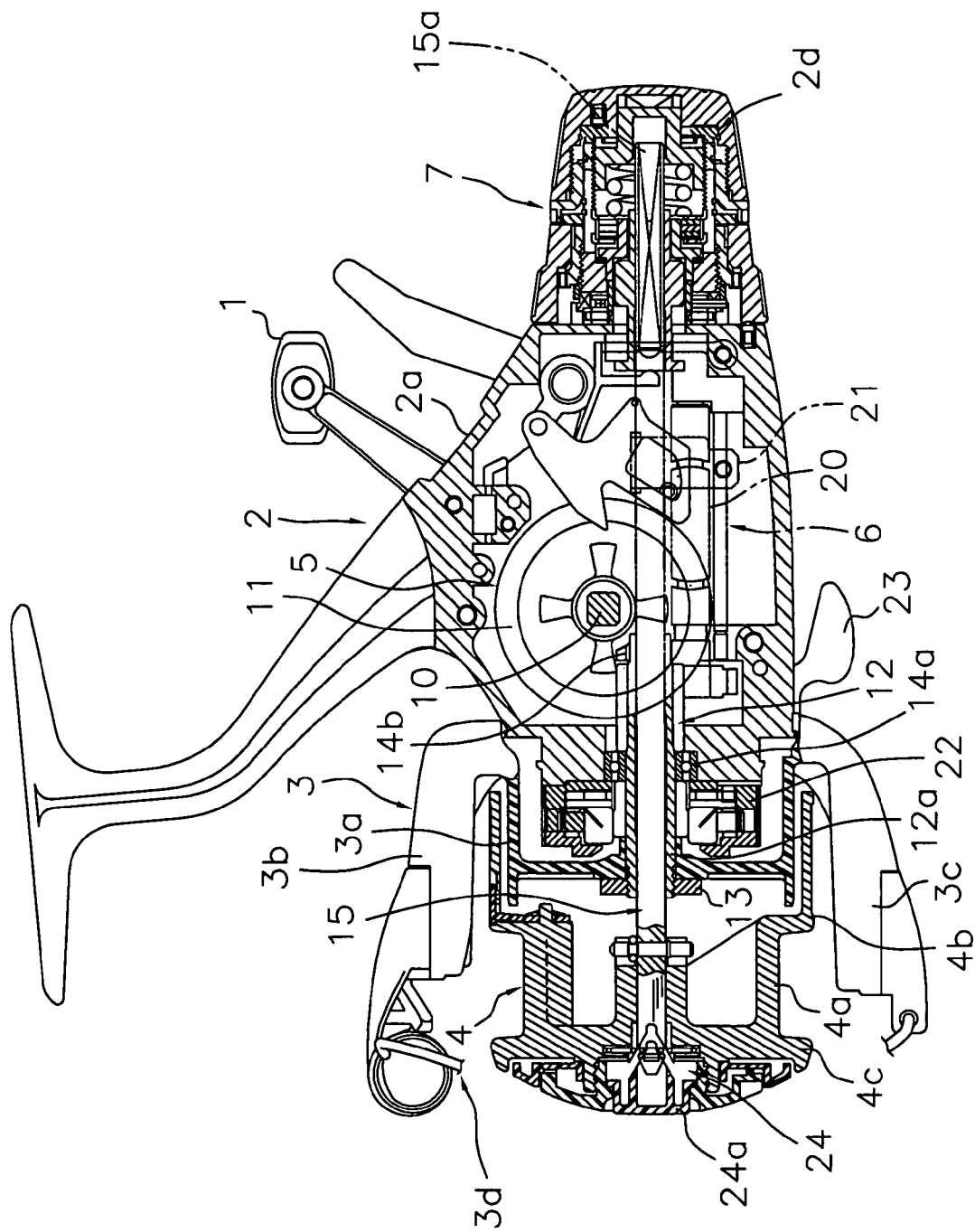
FIG. 1 is a partial cross-sectional view of a spinning reel equipped with a drag device in accordance with the present invention.

As shown in FIG. 1, a spinning reel according to an embodiment of the present invention includes a handle 1, a reel unit 2, a rotor 3 and a spool 4. The reel unit 2 rotatably supports the handle 1. The rotor 3 is rotatably supported on a front of the reel unit 2. The spool 4 has fishing line wound around an outer peripheral surface of the spool 4. The spool 4 is disposed on a front of the rotor 3 so that it can be moved back and forth.

Figure 2:
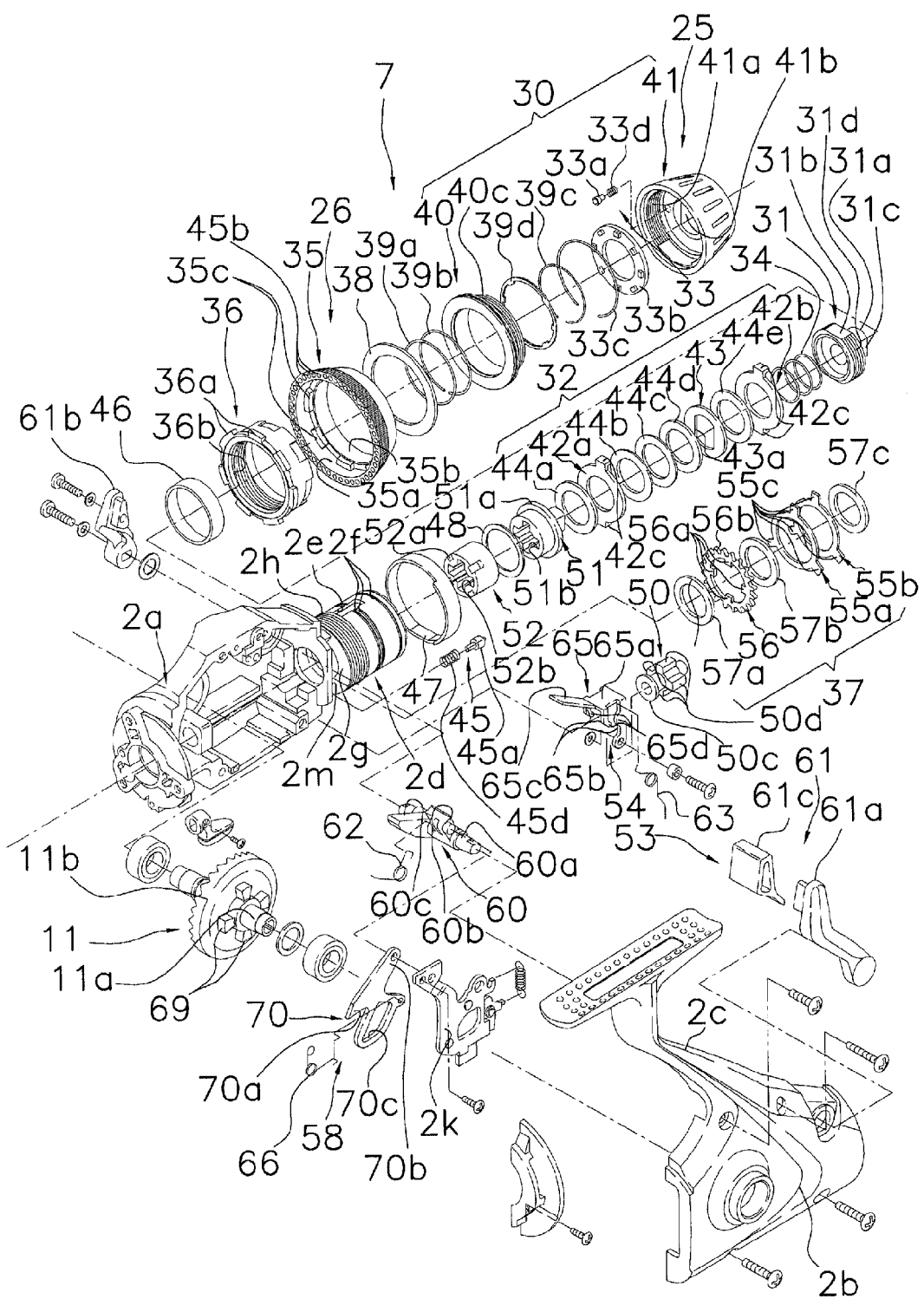
FIG. 2 is an exploded oblique segmentary view of the spinning reel illustrated in FIG. 1 in accordance with the present invention.

Referring to FIGS. 1 and 2, the reel unit 2 includes a reel body 2a and a lid member 2b. The reel body 2a is provided with various types of mechanisms mounted therein. The lid member 2b is detachably mounted to the reel body 2a. The lid member 2b forms a mechanism accommodation space that accommodates the various types of mechanisms between the lid member 2b and the reel body 2a. The reel body 2a is made of an aluminum alloy or a synthetic resin, for example. The lid member 2b is made of an aluminum alloy, for example.

Figure 3:
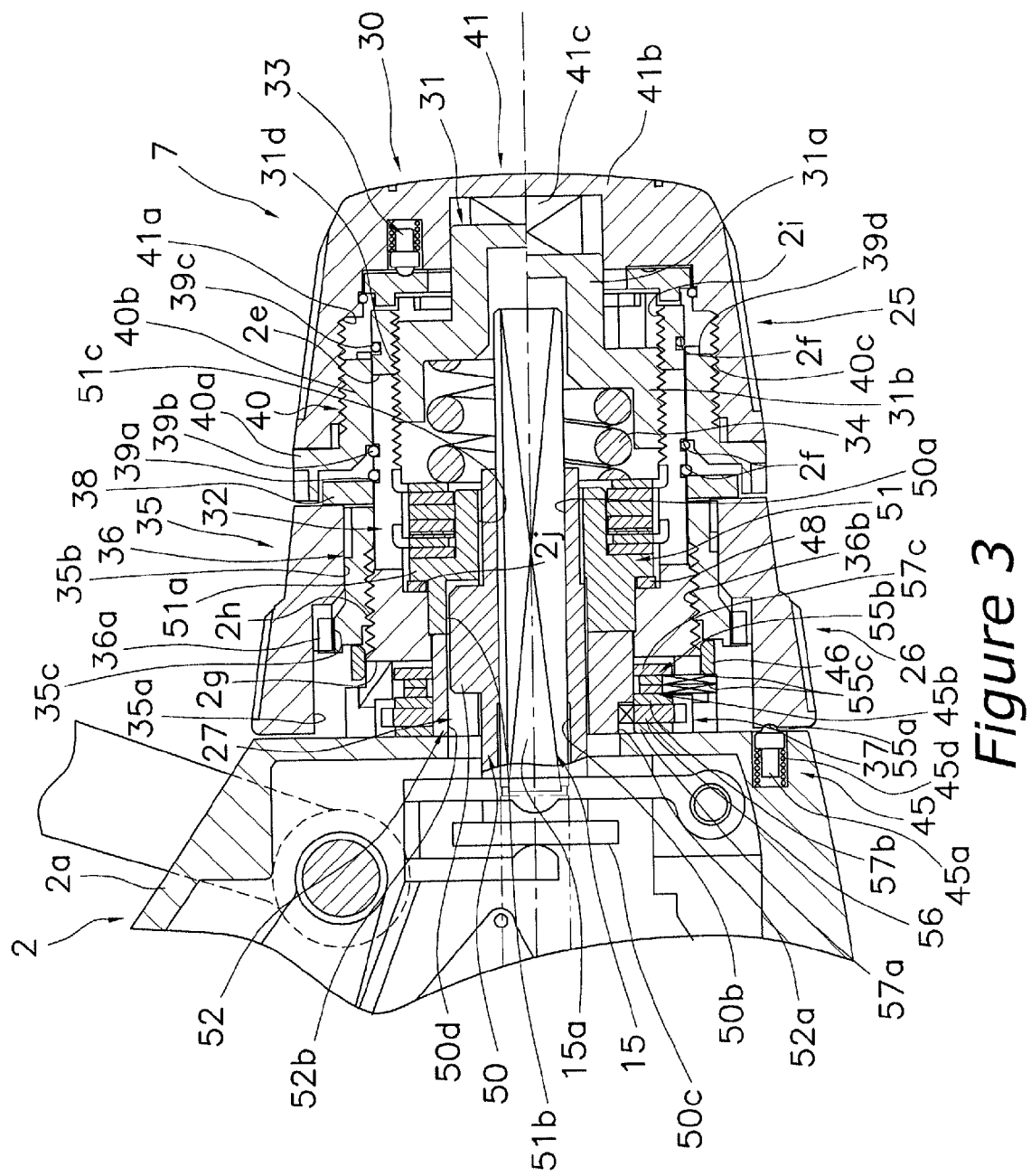
FIG. 3 is a partial cross-sectional enlarged view of a rear portion of the spinning reel of FIG. 1 in accordance with the present invention.

As shown in FIG. 2, the reel unit 2 further includes a T-shaped rod attachment leg 2c, a cylindrical portion 2d, a cutout portion 2g, a male-threaded portion 2h, a female-threaded portion 2i and an attachment base 2k. The lid member 2b is formed integrally with the rod attachment leg 2c. The rod attachment leg 2c extends in a back-and-forth direction at an upper portion of the rod attachment leg 2c. The cylindrical portion 2d extends rearward at a rear portion of the reel body 2a. As shown in FIGS. 2 and 3, the cylindrical portion 2d has a pair of engagement grooves 2e and a plurality of annular grooves 2f formed thereon. The engagement grooves 2e penetrate inner and outer peripheral surfaces of the cylindrical portion 2d and extend in the back-and-forth direction. The annular grooves 2f accommodate retaining rings 39a-39c. The cutout portion 2g is formed at a front portion of the cylindrical portion 2d so that the cutout portion 2g is cut out at an angle of about one third circle and is dimensioned suitably in the back-and-forth direction. A retaining hole (not shown) is formed in a center portion of the cutout portion 2g in the circumferential direction to penetrate the inner and outer peripheries of the cutout portion 2g in the radial direction. A cover member 47 is mounted on the outer periphery side of the cutout portion 2g to cover the cutout portion 2g. Additionally, the male-threaded portion 2h is formed on the outer peripheral surface on a front side of the cylindrical portion 2d. Referring to FIG. 3, the female-threaded portion 2i is formed on the inner peripheral surface on a rear side of the cylindrical portion 2d. Moreover, the attachment base 2k, which includes a metal plate, is formed to bend toward the lid member 2b. The attachment base 2k is fastened to the reel body 2a with a suitable fastening mechanism, such as a screw. The attachment base 2k extends in the vertical direction. A middle portion of the attachment base 2k extends rearward.

As shown in FIG. 1, the mechanism accommodation space is provided with a rotor driving mechanism 5, an oscillating mechanism 6 and a drag mechanism 7 (one example of a drag device according to the present invention). The rotor driving mechanism 5 rotates the rotor 3 in cooperation with rotation of the handle 1. The oscillating mechanism 6 oscillates the spool 4 back and forth to uniformly wind the fishing line onto the spool 4. The drag mechanism 7 brakes the spool 4 with strong and weak forces.

Referring to FIGS. 1 and 2, the rotor driving mechanism 5 includes a handle shaft 10, a master gear 11 and a pinion gear 12. The handle 1 is non-rotatably mounted to the handle shaft 10. The master gear 11 is composed of a face gear that rotates together with the handle shaft 10. The pinion gear 12 meshes with the master gear 11. The master gear 11 includes a master gear shaft 11a and a disk-shaped face gear portion 11b. The master gear shaft 11a engages with the handle shaft 10 to rotate together. The master gear shaft 11a is disposed at the face gear portion 11b. The pinion gear 12 extends in the back-and-forth direction. The pinion gear 12 is formed in a cylindrical shape that allows a spool shaft 15 to pass through the pinion gear 12. A front portion 12a of the pinion gear 12 passes through a center part of the rotor 3. The front portion 12a is fastened to the rotor 3 by a nut 13. The pinion gear 12 is rotatably supported in the reel unit 2 at a mid-portion by a bearing 14a and at a rear end portion by a bearing 14b.

A front end of the spool shaft 15 is connected to the spool 4. The oscillating mechanism 6 moves the spool shaft 15 with the spool 4 in the back-and-forth direction so that the spool 4 is moved in the same direction. The spool shaft 15 extends in a skewed direction with respect to the handle shaft 10. The oscillating mechanism 6 includes a threaded shaft 20 that rotates in cooperation with the pinion gear 12 and a slider 21 that is moved back and forth by the threaded shaft 20. The slider 21 is rotatably connected to the spool shaft 15 and is immovable in the axial direction.

As shown in FIG. 1, the rotor 3 includes a cylindrical portion 3a, first and second rotor arms 3b and 3c and a bail arm 3d. The first and second rotor arms 3b and 3c are integrally formed with a rear end of the cylindrical portion 3a. The first and second rotor arms 3b and 3c are spaced away from each other and extend frontward. The bail arm 3d is swingably mounted on front ends of the first and second rotor arms 3b and 3c. The bail arm 3d guides and winds the fishing line around the spool 4 by rotation of the rotor 3.

A reverse rotation check mechanism 22 that serves to prevent/allow reverse rotation of the rotor 3 is disposed in an interior of the cylindrical portion 3a of the rotor 3. The reverse rotation check mechanism 22 has a roller-type one-way clutch. The reverse rotation check mechanism 22 prevents or allows the reverse rotation of the rotor 3 by switching the one-way clutch between an operating state and a non-operating state with a switching lever 23. The switching lever 23 is swingably mounted on a front-lower surface of the reel unit 2.

The spool 4 is arranged between the first and second rotor arms 3b and 3c of the rotor 3. The spool 4 is non-rotatably mounted at the front end of the spool shaft 15. The spool 4 includes a bobbin trunk portion 4a, a skirt portion 4b and a front flange portion 4c. The front flange portion 4c is integrally formed with a front end of the bobbin trunk portion 4a. The skirt portion 4b is integrally formed with a rear of the bobbin trunk portion 4a. The bobbin trunk portion 4a winds the fishing line around a circumference of the spool 4. A one-touch attachment/detachment mechanism 24 with a push button 24a is located on a front portion of the bobbin trunk portion 4a. The spool 4 is easily detached from the spool shaft 15 by one push of the push button 24a of the one-touch attachment/detachment mechanism 24. In addition, the spool shaft 15 extends to the interior of the cylindrical portion 2d of the reel unit 2 that is provided with the drag mechanism 7. The spool shaft 15 has chamfers 15a that are formed parallel to each other on a rear-end portion of the spool shaft 15 for receiving the drag mechanism 7.

Configuration of Drag Mechanism

As shown in FIGS. 2 and 3, the drag mechanism 7 includes a first drag unit 25, a second drag unit 26 and a switching mechanism 27. The first drag unit 25 brakes the spool shaft 15. The second drag unit 26 brakes the spool shaft 15 in a position frontward of the first drag unit 25. The switching mechanism 27 switches the first drag unit 25 between a drag enabling state and a drag disabling state. The second drag unit 26 brakes the spool 4 through the spool shaft 15 with a maximum drag force which is weaker than the drag force of the first drag unit 25.

Configuration of First Drag Unit

The first drag unit 25 includes a closed-ended cylindrical first drag knob 30, a first pressing member 31 and a first pressed unit 32. The first drag knob 30 is rotatably mounted to an outer peripheral surface of the cylindrical portion 2d. The first drag knob 30 is immovable in the back and forth direction. The first pressing member 31 is rotatable and movable back and forth with the first drag knob 30. The first pressing member 31 is mounted on an inner peripheral surface of the cylindrical portion 2d by threading into an inner peripheral surface of the cylindrical portion 2d. The first pressed unit 32 is pressed by the first pressing member 31.

The first drag knob 30 includes a cylindrical first knob member 40 with a flange 40a and a closed-end cylindrical second knob member 41. The first knob member 40 is immovable in the axial direction and rotatably mounted to the cylindrical portion 2d. The second knob member 41 is screw-fixed to the first knob member 40 so as to close the rear end of the cylindrical portion 2d. The first knob member 40 composes a functional part of the first drag knob 30 that is immovable in the axial direction and rotatably connected to the cylindrical portion 2d. The first knob member 40 includes a flange 40a, a knob cylindrical portion 40b and a male-threaded portion 40c. Movement of a front end portion of the flange 40a and a rear end portion of the cylindrical portion 40b is restricted in the back-and-forth direction by C-shaped retaining rings 39b and 39c and a washer 39d. The retaining rings 39b and 39c are made of elastic wire and mounted into the annular grooves 2f. Rearward movement of the washer 39d is restricted by the C-shaped retaining ring 39c. The male-threaded portion 40c is formed on the outer peripheral surface of the cylindrical portion 40b to fasten the second knob member 41.

The second knob member 41 composes an operation part of the first drag knob 30 and a connection part connected to the first pressing member 31. The second knob member 41 has an outer peripheral surface for operation. The outer peripheral surface has a diameter that gradually decreases rearward. The second knob member 41 includes a female-threaded portion 41a, a bottom 41b and a slot recessed portion 41c. The female-threaded portion 41a is formed on an inner peripheral surface of the second knob member 41 to be threaded onto the male-threaded portion 40c. The slot recessed portion 41c is formed on a middle inner surface of the bottom 41b so that the first pressing member 31 is connected to the second knob member 41. Accordingly, the first pressing member 31 is rotatable with the second knob member 41 and movable in the axial direction.

A first sounding-pin type sounding mechanism 33 is disposed between the second knob member 41 and the rear-end portion of the cylindrical portion 2d to generate a sound by rotational operation of the first drag knob 30. The first sounding mechanism 33 includes a sounding pin 33a, a sounding ring 33b, a C-shaped retaining ring 33c and a coil spring 33d. The sounding pin 33a is mounted to the second knob member 41 so that it can advance and retreat. The sounding ring 33b is non-rotatably connected to the rear-end portion of the cylindrical portion 2d, which is rotatably connected to the first knob member 40. The sounding ring 33b is retained at the first knob member 40 by the C-shaped retaining ring 33c. The sounding pin 33a is urged toward the sounding ring 33b by the coil spring 33d.

The first pressing member 31 is a stepped cylindrical member that has a first cylindrical portion 31a, a second cylindrical portion 31b, a plurality of chamfers 31c and a male-threaded portion 31d. The second cylindrical portion 31b has a diameter larger than the first cylindrical portion 31a. Referring to FIG. 2, the chamfers 31c are formed parallel to each other on an outer peripheral surface of the first cylindrical portion 31a. The chamfers 31c engage the slot recessed portion 41c so as to rotate together with the second knob member 41. Accordingly, the first pressing member 31 is movable in the axial direction and connected to the second knob member 41. The male-threaded portion 31d is formed on an outer peripheral surface of the second cylindrical portion 31b to be threaded into the female-threaded portion 2i, which is formed on the inner peripheral portion of the cylindrical portion 2d. The first pressing member 31 moves back and forth in cooperation with rotation of the first drag knob 30. A coil spring 34 which is extended or compressed depending on a pressing force is disposed in a compressed state between the first pressing member 31 and the first pressed unit 32. The coil spring 34 is used to precisely increase or decrease the drag force of the first drag unit 25.

As shown in FIG. 2, the first pressed unit 32 includes two first drag washer components 42a and 42b, a second drag washer component 43 and five drag washers 44a-44e. The first drag washer components 42a and 42b engage the engagement grooves 2e of the cylindrical portion 2d so as to be non-rotatable with the cylindrical portion 2d. The second drag washer component 43 is in a non-rotatable state relative to the spool shaft 15 through the first engagement member 51. The drag washers 44a-44e are disposed among the first and second drag washer components 42a, 42b and 43. The drag washers 44a-44e are rotatable relative to both the cylindrical portion 2d and the spool shaft 15. Each of the first drag washer components 42a and 42b has a pair of ear portions 42c that protrude radially outward from an outer periphery so as to non-rotatably engage the engagement grooves 2e of the cylindrical portion 2d. The second drag washer component 43 has an elongated-circular-shaped slot 43a on an inner peripheral surface of the second drag washer component 43. The first drag washer component 42b on the rear side contacts the coil spring 34.

Configuration of Second Drag Unit

The second drag unit 26 includes a second drag knob 35, a second pressing member 36 and a second pressed unit 37. The second drag knob 35 is rotatably mounted on an outer peripheral surface of the cylindrical portion 2d in a position frontward of the first drag knob 30. The second drag knob 35 is immovable in the back and forth direction. The second pressing member 36 is rotatable with the second drag knob 35. The second pressing member 36 is movable in the back and forth direction. The second pressing member 36 is mounted on an outer peripheral surface of the cylindrical member 2d. The second pressing member 36 is disposed at a position frontward of the first drag knob 30 of the cylindrical member 2d and threaded into the outer peripheral surface of the cylindrical portion 2d. The second pressed unit 37 is pressed by the second pressing member 36.

The second drag knob 35 includes a substantially cylindrical member with an outer peripheral surface for operation and a diameter that gradually decreases in a rearward direction.

An outer diameter at a rear-end side of the second drag knob 35 is substantially equal to the outer diameter of the flange 40a of the first knob member 40. Thus, the first and second drag knobs 30 and 35 are arranged in a smooth continuation. An axial gap between the first and second drag knobs 30 and 35 is about 0.2 mm to 1.5 mm, for example. Preferably, the axial gap is about 0.3 mm to 0.8 mm, for example. In addition, an axial gap between the second drag knob 35 and a front wall portion 2m of the cutout portion 2g is about 0.2 mm to 1.5 mm, for example. Preferably, the axial gap between the second drag knob 35 and the front wall portion 2m is about 0.3 mm to 0.8 mm, for example. The second drag knob 35 includes a larger-diameter portion 35a, a smaller-diameter portion 35b and a plurality of inner protrusions 35c. The smaller-diameter portion 35b is located in a position rearward of the larger-diameter portion 35a. The larger-diameter 35a and the smaller-diameter 35b are formed on an inner peripheral surface of the second drag knob 35. The larger-diameter portion 35a is disposed on the outer periphery side of the cutout portion 2g of the cylindrical portion 2d. The smaller-diameter portion 35b is rotatably supported on the outer peripheral surface of the cylindrical portion 2d. The inner protrusions 35c protrude radially inward from the inner peripheral surface in a boundary part between the larger and smaller-diameter portions 35a and 35b on a larger-diameter portion side. Thus, the inner protrusions 35c non-rotatably couple the second pressing member 36 to the second drag knob 35 such that the second pressing member 36 is axially movable. The inner protrusions 35c are spaced at circumferential intervals. The rearward movement of the second drag knob 35 is restricted by a washer 38. The rearward movement of the washer 38 is restricted by a C-shaped retaining ring 39c that is mounted into the front-side annular groove 2f. Additionally, the frontward movement of the second drag knob 35 is restricted by the front wall 2m of the cutout portion 2g of the cylindrical portion 2d of the reel body 2a. As a result, the second drag knob 35 is immovable back and forth similar to the first drag knob 30. A second sounding-pin type sounding mechanism 45 is disposed between the second drag knob 35 and a wall of the reel body 2a on the base side of the cylindrical portion 2d to generate a sound by rotational operation on the second drag knob 35. The second sounding mechanism 45 includes a sounding pin 45a, a plurality of sounding cavities 45b, and a coil spring 45d. The sounding pin 45a is mounted to the rear end surface of the reel body 2a. The sounding cavities 45b are formed on a front surface of the second drag knob 35. The sounding pin 45a is urged toward the sounding cavities 45b by the coil spring 45d.

The second pressing member 36 includes a substantially cylindrical member with a plurality of outer protrusions 36a and a pressing member female-threaded portion 36b. The outer protrusions 36a are formed on a forward end outer peripheral surface of the second pressing member 36 so as to protrude radially outward. Thus, the outer protrusions 36a non-rotatably engage the inner protrusions 35c such that the outer protrusions 36a and the inner protrusions 35c are axially immovable. The pressing member female-threaded portion 36b is formed on an inner peripheral surface of the second pressing member 36 for being threaded onto the male-threaded portion 2h of the cylindrical portion 2d. The second pressing member 36 moves back and forth in cooperation with rotation of the second drag knob 35. A cylindrical spacer 46 is mounted on the outer peripheral surface of the cylindrical portion 2d between the second pressing member 36 and the second pressed unit 37. The spacer 46 is a member that transmits a pressing force of the second pressing member 36 to the second pressed unit 37.

As shown in FIG. 2, the second pressed unit 37 includes two third drag washer components 55a and 55b, a fourth drag washer component 56, and three drag washers 57a-57c. The third drag washer components 55a and 55b non-pivotably engage the cutout portion 2g and are non-rotatable with the cylindrical portion 2d. The fourth drag washer component 56 is capable of being in a non-rotatable state relative to the spool shaft 15 through the second engagement member 52. The drag washers 57a-57c are disposed among the drag washer components 55a, 55b and 56 and are rotatable with both the cylindrical portion 2d and the spool shaft 15. Each of the third drag washer components 55a and 55b has a plurality of (e.g., three) ear portions 55c that protrude radially outward from an outer periphery of the third drag washer components 55a and 55b so as to non-rotatably engage the cutout portion 2g and its retaining hole. The spacer 46 contacts the ear portions 55c of the third drag washer component 55b on the rear side. Thus, the second pressing member 36 presses the second pressed unit 37. The fourth drag washer component 56 has a plurality of (e.g., four) inner protrusions 56a that are located on an inner peripheral surface of the fourth drag washer component 56. The fourth drag washer component 56 further has sounding protrusions 56b for a drag sounding mechanism (not shown), which generates a sound when the drag mechanism 7 is operated by rotation of the spool shaft 15. The sounding protrusions 56b are spaced at circumferential intervals on an outer peripheral surface of the fourth drag washer component 56. The front-side drag washer 57a is configured to contact the front wall portion 2m of the cutout portion 2g (FIG. 2).

Configuration of Switching Mechanism

The switching mechanism 27 includes a switching member 50, first and second engagement members 51 and 52 and a switching lever 53. The switching mechanism 27 is non-rotatably mounted to the spool shaft 15 and is movable back and forth between a first position shown in FIG. 4 and a second position, which is frontward of the first position, as shown in FIG. 5. The first and second engagement members 51 and 52 are disposed on an outer periphery side of the switching member 50. The switching lever 53 is operated to move the switching member 50 between the first and second positions. In addition, the switching mechanism 27 further includes a moving mechanism 54 and a return mechanism 58. The moving mechanism 54 moves the switching member 50 back and forth when the switching lever 53 is moved back and forth. The return mechanism 58 moves the moving mechanism 54 by rotation of the handle 1 in a line-retrieving direction in a case where the switching member 50 is located in the second position so that the switching member 50 is returned to the first position.

As shown in FIGS. 2 and 3, the switching member 50 includes a substantially cylindrical member that engages the chamfers 15a of the spool shaft 15 so as to be integrally rotatable with the spool shaft 15. The switching member 50 is movable back and forth in a spool shaft axial direction between the first and second positions. The switching member 50 is non-rotatably coupled to the first and second engagement members 51 and 52 in a case where the switching member 50 is located in the first position shown in FIG. 4, and is coupled non-rotatably only to the second engagement member 52 in a case where the switching member 50 is located in the second position. As a result, in a case where the switching member 50 is located in the second position, the first engagement member 51 is rotatable relative to the spool shaft 15. Thus, even when the spool shaft 15 rotates, the first engagement member 51 does not rotate with the spool shaft 15. Accordingly, the first drag unit 25 is in a drag disabling state. An elongated hole 50a and a circular hole 50b are arranged on an inner peripheral surface of the switching member 50 in the back-and-forth direction. The elongated hole 50a has parallel surfaces that engage the chamfers 15a. The circular hole 50b is located frontward of the elongated hole 50a. The circular hole 50b is capable of moving frontward beyond the chamfers 15a. The elongated hole 50a allows the switching member 50 to rotate constantly with the spool shaft 15. The switching member 50 further includes a larger-diameter flange 50c and a plurality of (e.g., four) rotation stop protrusions 50d formed on an outer peripheral surface of the switching member 50. The larger-diameter flange 50c engages the moving mechanism 54. The rotation stop protrusions 50d non-rotatably engage the first and second engagement members 51 and 52.

The first engagement member 51 non-rotatably engages the switching member 50 when the switching member 50 is located in the first position, and is mounted to the cylindrical portion 2d in a state where the frontward movement is restricted. The first engagement member 51 includes a cylindrical member with a flange 51a, an engagement hole 51b and a mount hole 51c. The flange 51a is located in an axial middle portion of the first engagement member 51. The first engagement member 51 is disposed in the interior of the cylindrical portion 2d on the outer periphery side of the switching member 50. The engagement hole 51b and the mount hole 51c are formed on an inner peripheral surface of the first engagement member 51 so that they are arranged in the axial direction. The engagement hole 51b has a cross shape in the cross-sectional view. The engagement hole 51b engages the rotation stop protrusions 50d of the switching member 50. The mount hole 51c is formed in a position rearward of the engagement hole 51b. The first pressed unit 32 is mounted on an outer peripheral surface rearward of the flange 51a. The drag washer 44a is located at the frontward end in the first pressed unit 32. The drag washer 44a is pressed toward the flange 51a and contacts a rear surface of the flange 51a. A front surface of the flange 51a contacts a wall 2j that is formed on the inner peripheral surface in a position rearward of the cutout portion 2g of the cylindrical portion 2d via a washer member 48. The second drag washer component 43 is in a non-rotatable state relative to the spool shaft 15 through the first engagement member 51. Specifically, the slot 43a engages the first engagement member 51.

The second engagement member 52 includes a cylindrical member that is arranged in a position frontward of the first engagement member 51. The second engagement member 52 non-rotatably engages the switching member 50 when the switching member 50 is located in the second position. The second engagement member 52 is mounted to the cylindrical portion 2d in a state where the frontward movement is restricted. In addition, in this embodiment, the second engagement member 52 non-rotatably engages the switching member 50 also when the switching member 50 is located in the first position. Accordingly, when the spool shaft 15 rotates in the drag operation by either of the first and second drag units 25 and 26, a sound is constantly generated during the drag operation since the fourth drag washer component 56 constantly rotates. The second pressed unit 37 is mounted on an outer peripheral surface of the second engagement member 52. The second engagement member 52 includes a plurality of (e.g., four) engagement recessed portions 52a and an engagement hole 52b. The engagement recessed portions 52a are formed on a front portion of the outer peripheral surface of the second engagement member 52 to engage the inner protrusions 56a of the fourth drag washer component 56. The fourth drag washer component 56 is capable of being in a non-rotatable state relative to the spool shaft 15 through the second engagement member 52. Specifically, the inner protrusions 56a engage the second engagement member 52 via the engagement recessed portions 52a such that the second engagement member 52 and the fourth drag washer component 56 rotate together. The engagement hole 52b has a cross shape in the cross-sectional view. The engagement hole 52b is formed on an inner peripheral surface of the second engagement member 52 to engage the rotation stop protrusions 50d of the switching member 50. As a result, the fourth drag washer component 56 is rotatable with the spool shaft 15 via the second engagement member 52.

Figure 4:
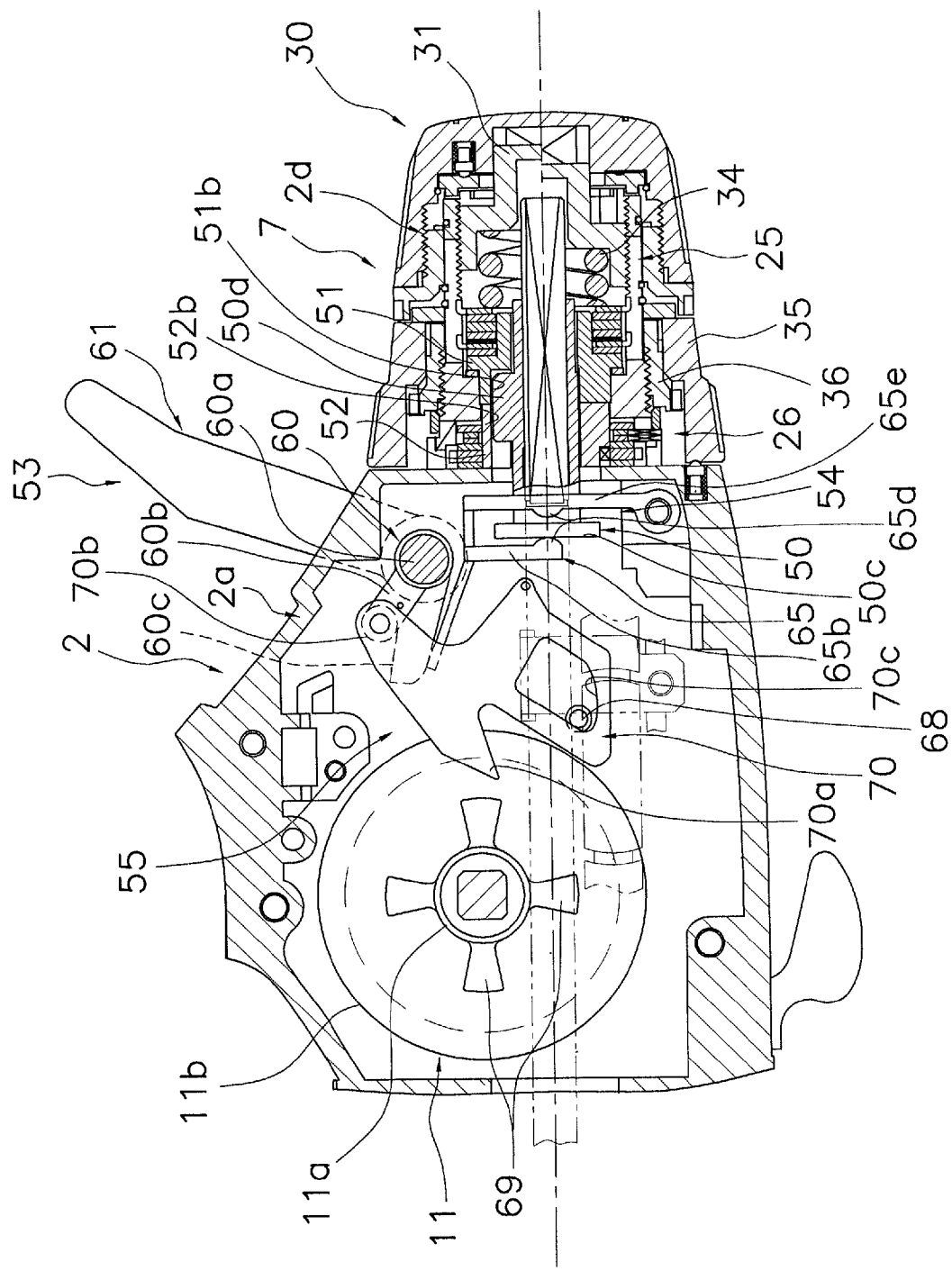
FIG. 4 is a partial cross-sectional view of a drag mechanism of the spinning reel of FIG. 1 when a switching member is located in a first position.
Figure 5:
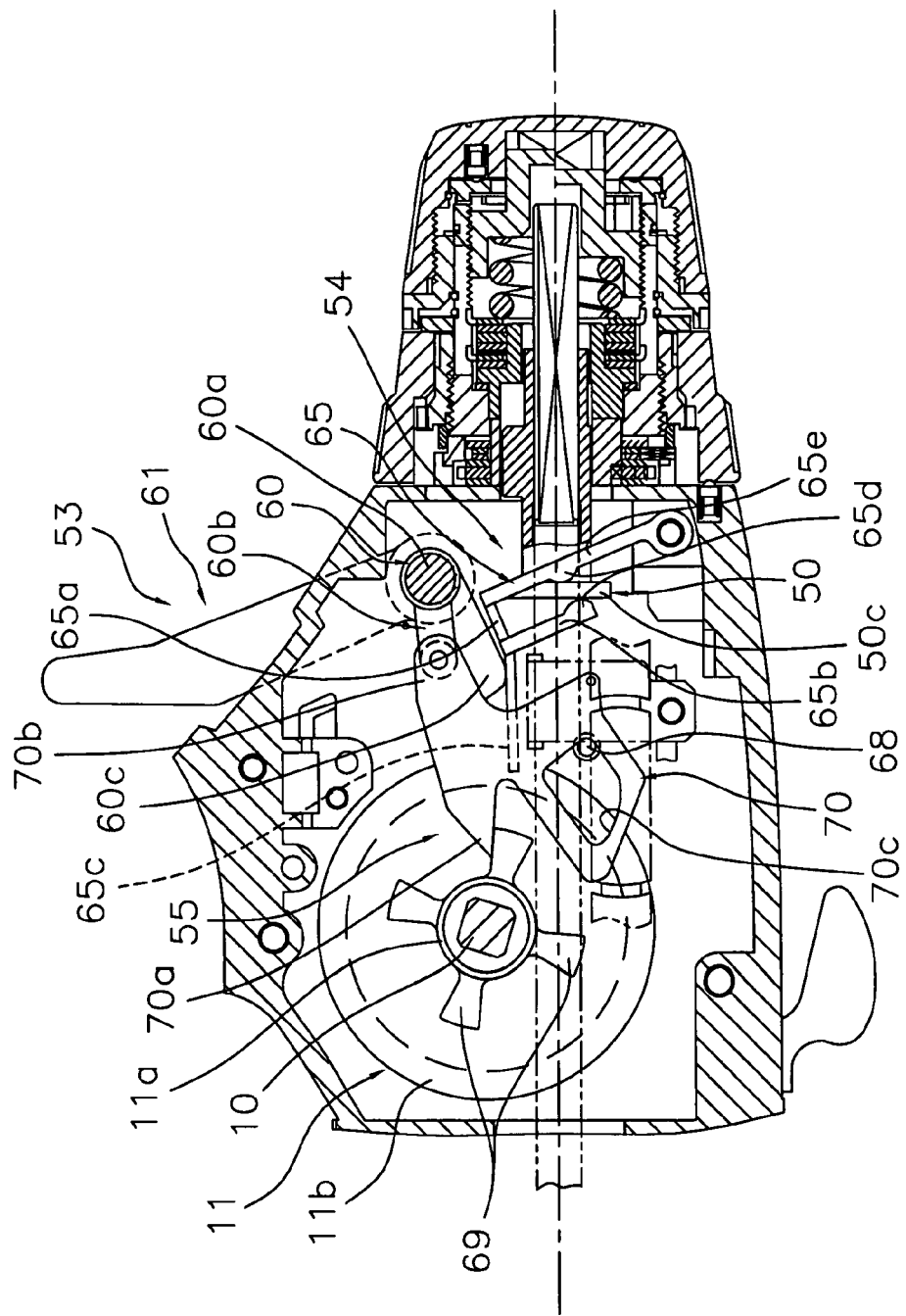
FIG. 5 is a partial cross-sectional view of the drag mechanism of FIG. 4 when the switching member is located in a second position.

As shown in FIGS. 2 and 4, the switching lever 53 is swingably mounted to the reel body 2a around an axis with respect to the spool shaft 15. The switching lever 53 includes a switching shaft 60 and a lever body 61. The switching shaft 60 is pivotably mounted to the reel body 2a and the lid member 2b about the same axis that the switching lever 53 is mounted to. The lever body 61 is mounted to an end of the switching shaft 60 and is pivotable with the switching shaft 60. The switching shaft 60 includes a shaft portion 60a, a connection arm 60b and a cam arm 60c. The shaft portion 60a is arranged in parallel to the handle shaft 10. Both the connection arm 60b and the cam arm 60c are formed to radially protrude from the shaft portion 60a. The switching shaft 60 is urged by a toggle spring 62 shown in FIG. 2 so that it is toggled between a front position corresponding to the first position of the switching member 50 shown in FIG. 4 and a rear position corresponding to the second position of the switching member 50 shown in FIG. 5. The toggle spring 62 has one end which is retained to the switching shaft 60 and the other end which is retained to the attachment base 2k.

The lever body 61 includes a pair of right and left lever members 61a and 61b, and a connection member 61c. The connection member 61c connects fore end parts of both the right and left lever members 61a and 61b. The switching shaft 60 is pivoted between the back and front positions by the lever body 61. Thus, the switching member 50 is located between the first and second positions, respectively. As a result, the first drag unit 25 is configured to be switched between the drag enabling state and the drag disabling state.

Referring to FIGS. 2, 4 and 5, the moving mechanism 54 includes a moving member 65 that is swingably mounted to the rear portion of the reel body 2a between a third position corresponding to the first position and a fourth position corresponding to the second position. The moving member 65 includes a rectangular body portion 65a, four legs 65b, and an operating portion 65c. The operating portion 65c extends frontward from the body portion 65a. The four legs 65b extend downward from the four corners of the body portion 65a. Among the legs 65b, a leg 65e that is located on a rear side of the moving member 65 extends farther downward than the other legs 65b. The leg 65e is swingably mounted to the reel body 2a. Each of the legs 65b include protrusions 65d that are arranged opposed to each other to sandwich the larger-diameter flange 50c of the switching member 50. The protrusions 65d sandwich and swing the larger-diameter flange 50c. Thus, the moving member 65 moves the switching member 50 between the first and second positions. The operating portion 65c is in contact with the cam arm 60c and is pressed by the cam arm 60c. Thus, the moving member 65 swings from the third position to the fourth position. In addition, the moving member 65 is urged toward the third position by a twisted coil spring 63. When the cam arm 60c swings clockwise in FIG. 5, the moving member 65 is pivoted from the fourth position to the third position by the twisted coil spring 63.

The return mechanism 58 includes return protrusions 69 and the return plate 70. The return protrusions 69 protrude from the back surface of the master gear 11. The return plate 70 moves from a disengagement position shown in FIG. 4 to an engagement position shown in FIG. 5 by swinging the switching lever 53 from the rear position to the front position. The return protrusions 69 radially protrude from the master gear shaft 11a at the back surface side of the face gear portion 11b of the master gear 11. Four return protrusions 69, for example, are spaced at circumferential intervals in the rotation direction. The return plate 70 moves between the engagement position that engages the return protrusions 69 and the disengagement position that disengages from the return protrusions 69. The return plate 70 includes a return pawl 70a, a connection portion 70b and a position restricting opening 70c. The return pawl 70a contacts the return protrusions 69. The connection portion 70b is pivotably coupled to the fore end of the connection arm 60b. The position restricting opening 70c is formed downward from the return pawl 70a. The return pawl 70a protrudes toward the handle shaft 10, and can contact the top surface of the return protrusions 69 when located in the engagement position. The position restricting opening 70c is arranged to engage a restricting pin 68 that is mounted to the attachment base 2k in order to restrict the position of the return plate 70 so that the return plate 70 is held between the disengagement and engagement positions. The return plate 70 is urged by a toggle spring 66 so that the return plate 70 is toggled between the disengagement and engagement positions. When the switching lever 53 is operated from the rear position shown in FIG. 4 to the front position shown in FIG. 5, the return plate 70 is moved from the disengagement position shown in FIG. 4 to the engagement position shown in FIG. 5. On the other hand, when the switching lever 53 is operated from the front position shown in FIG. 5 to the rear position shown in FIG. 4, the return plate 70 is moved from the engagement position shown in FIG. 5 to the disengagement position shown in FIG. 4. Additionally, in a case where the return plate 70 is located in the engagement position, when the handle 1 is rotated in the line-retrieving direction and the master gear 11 is rotated counterclockwise in FIG. 5, the return protrusions 69 presses the return pawl 70a of the return plate 70. Thus, the return plate 70 is swung to the disengagement position by the toggle spring 66.

Operation of Drag Mechanism

In a case where the drag force of the first drag unit 25 is adjusted, the first drag knob 30 is rotated. When the first drag knob 30 is rotated, the first pressing member 31 that is threaded into the female-threaded portion 2i formed on the inner peripheral surface of the cylindrical portion 2d is rotated and moved back and forth. Thus, the pressing force on the first pressed unit 32 via the coil spring 34 varies. As a result, the drag force of the first drag unit 25 varies. Specifically, when the first drag knob 30 is rotated clockwise when viewed from the rear, the first pressing member 31 is moved forward (leftward in FIG. 1). As a result, the drag force increases. On the other hand, when the first drag knob 30 is rotated counterclockwise, the first pressing member 31 is moved backward. As a result, the drag force decreases. In this case, since the movement in the back-and-forth direction of the second knob member 41 is restricted, the first drag knob 30 is not moved in the back-and-forth direction.

In a case where the drag force of the second drag unit 26 is adjusted, the second drag knob 35 is rotated. When the second drag knob 35 is rotated, the second pressing member 36 that is threaded into the male-threaded portion 2h formed on the outer peripheral surface of the cylindrical portion 2d is rotated and moved back and forth. Thus, the pressing force on the second pressed unit 37 varies. As a result, the drag force of the second drag unit 26 varies. Specifically, when the second drag knob 35 is rotated clockwise when viewed from the rear, the second pressing member 36 is moved forward (leftward in FIG. 1). As a result, the drag force increases. On the other hand, when the second drag knob 35 is rotated counterclockwise, the second pressing member 36 is moved backward. As a result, the drag force decreases. In this case, since the movement in the back-and-forth direction of the first drag knob is restricted, the second drag knob 35 is not moved in the back-and-forth direction.

In this construction, both the first and second drag knobs 30 and 35 are immovably mounted back and forth to the cylindrical portion 2d. For this reason, when either of the first and second drag knobs 30 and 35 is rotated, neither of the first and second drag knobs 30 and 35 is moved back and forth but is only rotated. Accordingly, a gap between both the first and second drag knobs 30 and 35 and a gap between the second drag knob 35 and the reel unit 2 are reduced as much as possible. Therefore, it is possible to prevent a foreign substance from getting into both the first and second drag knobs 30 and 35 as much as possible.

When an angler is fishing with the reel, the drag forces of the first and second drag units 25 and 26 are adjusted as discussed above. Then, the angler casts tackle with a live bait fish into the water. After that, the switching lever 53 is swung from the rear position shown in FIG. 4 to the front position shown in FIG. 5. When the switching lever 53 is pivoted toward the front position, the switching shaft 60 is swung. Thus, the cam arm 60c presses the operating portion 65c of the moving member 65. Accordingly, the moving member is swung counterclockwise in FIG. 4 from the third position to the fourth position. Thus, the switching member 50 is moved from the first position to the second position. As a result, the first engagement member 51 and the switching member 50 are disconnected. Thus, the first drag unit 25 is converted into the drag disabling state. For this reason, a drag force applied on the spool 4 turns to the drag force by the second drag unit 26. The drag force caused by the second drag unit 26, as adjusted as above, does not allow the swimming live bait fish to rotate the spool 4 in the line-releasing direction, but releases fishing line when a fish strikes the tackle. The angler will wait for a fish strike with the first drag unit 25 in the drag disabling state.

When a fish strikes the tackle, the spool 4 rotates in the line-releasing direction, and the drag sounding mechanism generates a sound. Then, the angler rotates the handle 1 in the line-retrieving direction to rotate the rotor 3 and wind-up the fishing line. On the other hand, the master gear 11 rotates in the line-retrieving direction (counterclockwise in FIG. 5). Thus, the return protrusion 69 pushes the return pawl 70a so that the return pawl 70a returns to the disengagement position from the engagement position. As a result, the switching shaft 60 rotates counterclockwise in FIG. 5. Thus, the moving member 65 returns from the fourth position to the third position and the switching member turns from the second position to the first position. Consequently, the first engagement member 51 and the switching member 50 are non-rotatably connected to each other. Thus, the first drag unit 25 is converted into the drag enabling state, and a strong drag force is applied to the spool 4 that prevents the fishing line from breaking. In this state, the angler can wind the fishing line to catch the fish that struck the tackle.

In the present invention, since both the first and second drag knobs 30 and 35 are constructed so as not to move back and forth, when either of the first and second drag knobs 30 and 35 is rotated, neither of the first and second drag knobs 30 and 35 is moved back and forth but is only rotated. Accordingly, a gap between both the first and second drag knobs 30 and 35, and a gap between the second drag knob 35 and the reel unit 2 are reduced to be as small as possible. Therefore, it is possible to prevent a foreign substance from getting into both the first and second drag knobs 30 and 35 as much as possible.

OTHER EMBODIMENTS

It will be apparent to one of ordinary skill in the art from this disclosure that although the maximum drag force of the first drag unit 25 is larger than the second drag unit 26 in the above embodiment, the reverse is possible as well as providing the same amount of drag force for the first and second drag units 25 and 26.

In the foregoing embodiment, the second drag unit 26 is constructed to be brought in the drag enabling state so that a sound is generated in operation of either of the first and second drag units 25 and 26 even in a case where the switching member 50 is located in the first position. However, the second drag unit 26 may be brought in the drag disabling state in a case where the switching member 50 is located in the first position. In this case, it is preferable to provide two drag sounding mechanisms corresponding to operation of the respective first and second drag units 25 and 26.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention. Accordingly, these terms, as utilized to describe the present invention should be interpreted relative to a fishing reel equipped with the present invention as used in the normal position after casting.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A drag device for a spinning reel arranged on a rear portion of a reel unit of the spinning reel comprising:

a first drag unit configured for braking a spool shaft of a spool, the first drag unit including a first drag knob that is immovable in a back and forth direction and configured to be rotatably mounted to an outer peripheral surface of a cylindrical portion at a rear portion of the reel unit, a first pressing member that is rotatable and movable in the back and forth direction within the first drag knob and configured to be threaded onto an inner peripheral surface of the cylindrical portion, and a first pressed unit that is pressed by the first pressing member;

a second drag unit configured for braking the spool shaft at a position frontward of the first drag unit, the second drag unit including a second drag knob that is immovable in the back and forth direction and configured to be rotatably mounted to the outer peripheral surface of the cylindrical portion at a position frontward of the first drag knob, and a second pressing member that is rotatable and movable in the back and forth direction within the second drag knob and configured to be threaded onto the outer peripheral surface of the cylindrical portion at a position frontward of the first drag knob, and a second pressed unit that is pressed by the second pressing member;

a sounding mechanism including a sounding pin, a plurality of sounding cavities, and a coil spring, the sounding cavities formed on a front surface of the second drag knob, the sounding pin disposed between the second drag knob and a rear end surface of the reel unit and urged toward the sounding cavities by the coil spring; and a switching mechanism arranged to switch the first drag unit between a drag enabling state and a drag disabling state.

2. The drag device for a spinning reel as set forth in claim 1, wherein the first pressing member presses the first pressed unit in a direction toward the switching mechanism, and the second pressing member presses the second pressed unit in a direction toward the reel unit.

3. The drag device for a spinning reel as set forth in claim 1, wherein the second drag unit brakes the spool shaft with a maximum drag force that is weaker than a drag force of the first drag unit.

4. The drag device for a spinning reel as set forth in claim 1, wherein the switching mechanism includes a cylindrical switching member that is movable back and forth between a first position and a second position, which is frontward of the first position, and non-rotatably mounted to the spool shaft, a cylindrical first engagement member configured to be mounted to the cylindrical portion such that frontward movement is restricted and having a flange that non-rotatably engages the switching member when the switching member is located in the first position, a cylindrical second engagement member configured to be mounted to the cylindrical portion such that frontward movement is restricted and disposed frontward of the first engagement member to non-rotatably engage the switching member when the switching member is located in the second position, and a switching lever configured to be mounted to the reel unit and swingable around an axis with respect to the spool shaft to move the switching member back and forth between the first position and the second position.

5. The drag device for a spinning reel as set forth in claim 4, wherein
the first pressed unit includes at least one first drag disk that is non-rotatably mounted on an outer peripheral surface of the first engagement member, and at least one second drag disk that is mounted on the outer peripheral surface of the first engagement member with the first drag disk and configured to be non-rotatably engaged to the cylindrical portion, and
the second pressed unit includes at least one third drag disk that is non-rotatably mounted on an outer peripheral surface of the second engagement member, and at least one fourth drag disk that is rotatably mounted on the outer peripheral surface of the second engagement member with the third drag disk and configured to be non-rotatably engaged to the cylindrical portion.

6. The drag device for a spinning reel as set forth in claim 1, wherein
the first drag knob includes a cylindrical first knob member with a flange that is immovable in an axial direction and configured to be rotatably mounted to the cylindrical portion, and a closed-end cylindrical second knob member that is fixed to the first knob member so as to close the rear end of the cylindrical portion, and
the first pressing member is rotatable with the second knob member and movable in the axial direction.

* * * * *